Patented Aug. 17, 1926.

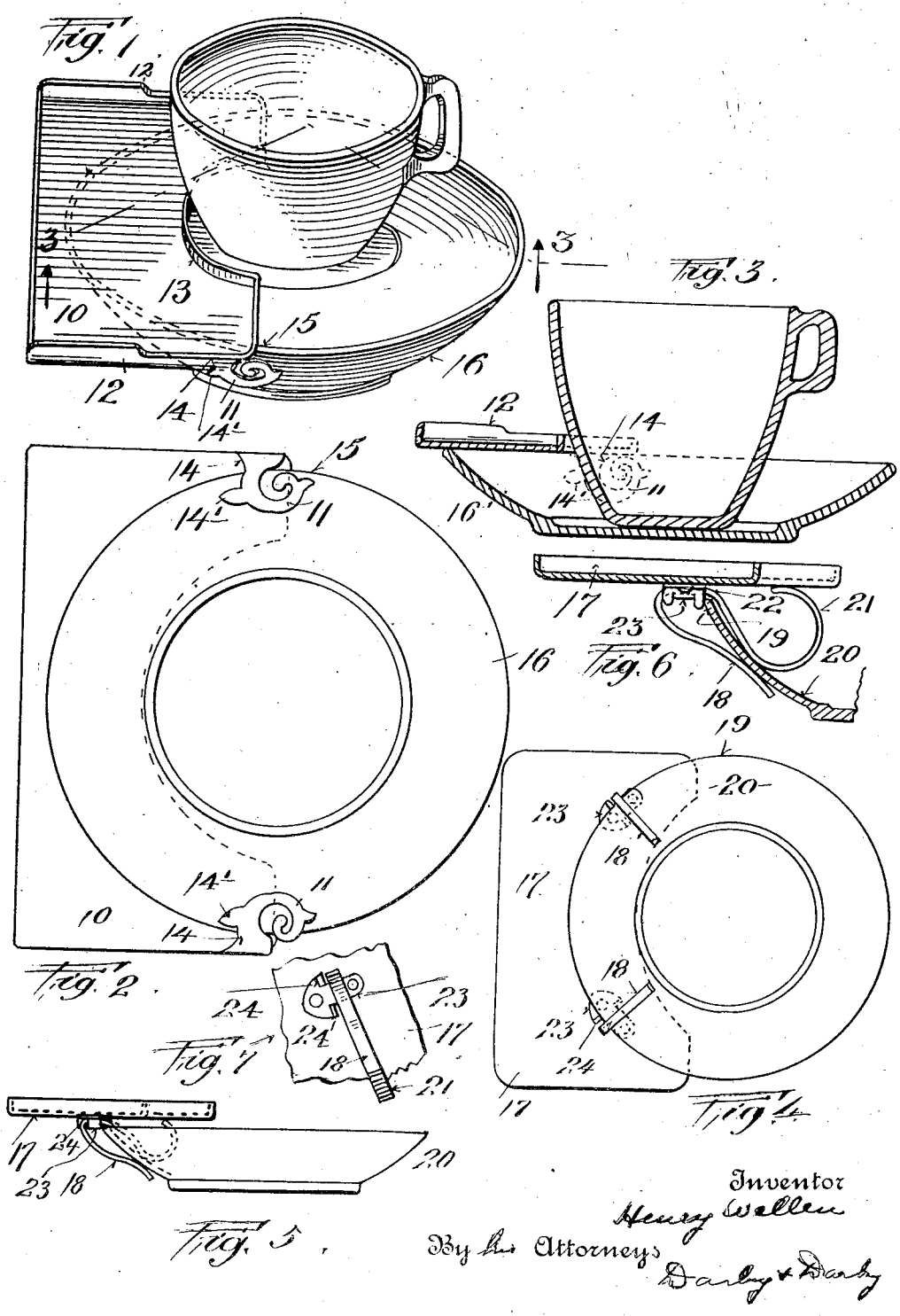

1,596,133

UNITED STATES PATENT OFFICE.

HENRY WELLEN, OF NEW YORK, N. Y.

ATTACHABLE TRAY.

Application filed December 30, 1924. Serial No. 758,804.

This invention relates to guest trays of the type that are provided with means for quickly attaching the tray to a plate or saucer for serving refeshments.

My invention further includes in its objects means for quickly serving light refreshments, which means, when it assumes the form of a tray, is attached to the saucer of a coffee or tea cup.

I further provide said tray with attaching devices that are designed for holding the tray at different positions on the saucer of a coffee or tea cup. The tray is further shaped to provide a nesting space for the cup, and the clamping means are so constructed as to permit ready and convenient storing when not in use. My attachable tray obviously can be made to serve other purposes than cake or sandwich tray, as I contemplate the same for use as an ash tray or cigar tray with the coffee cup, if desired.

Other objects will appear hereinafter, and I attain these objects by the construction illustrated in the accompanying drawing, in which—

Figure 1 is a view in perspective of a construction embodying my invention.

Fig. 2 is a bottom plan view showing the relation of tray and saucer.

Fig. 3 is a sectional view taken on the line 3—3 of Fig. 1.

Fig. 4 is a bottom plan view of tray and saucer showing a folding clamp applied to the tray and clamped onto the saucer.

Fig. 5 is a side view thereof.

Figs. 6 and 7 are detail views showing the folding clamp.

Like numerals refer to similar parts throughout the several views.

The present-day tendency towards cramped apartments, small houses and still smaller rooms calls for a readjustment in custom and requires improvements in household facilities for entertaining informally. It is my special aim in this connection to provide convenient and practical means, as attachable plates that are always available for quickly serving refreshments. This attachable plate or dish provides in effect an extra plate with the cup and saucer, all of which can be easily held in one hand, thus leaving the other hand free. To this end I provide a service tray 10 of proper dimension to meet the required needs. In the form illustrated the tray is designed to be attached by suitable clips 11 to the saucer of a coffee or tea cup for serving salads, sandwiches, cookies or the like, with the coffee or the tea. The tray may be constructed of metal or other material suitably finished to give a neat and attractive appearance, and it is provided with a projecting rim 12 to protect the food from slipping off. To provide room for the cup and to give better holding space I provide the tray with a recess 13 of curved contour. In a preferred form the spring clips 11 are secured to the outer edges of the tray by the spring base 14 to thereby provide for resiliently engaging the edge 15 of a saucer 16. The ear 14' on clip 11 may be of any desired extent to thereby provide for a wide base of support to more securely hold the tray. It will be noted that this type of clip construction not only provides for the flexibility of the spring clip in the several directions, but that it also provides for holding the tray on the saucer in different positions, that is, at different distances from the cups and that the shape and position of the clips permit several trays to be nested and stored without taking up much space. In a preferred form of construction and as is shown in Figures 1 and 2 in particular the tray extends well over the dish or saucer and the covered edge and tends to support the cup in place so that it will not readily tip or slide from the saucer when the tray is used.

In Figs. 4, 5, 6 and 7 I have shown a guest tray 17 which is much like the tray 10, and in fact it may be a duplicate thereof, excepting that I provide hingedly attached spring clips 18. These clips may assume the shape shown, or the equivalent thereof, to engage the edge 19 and sides 20 of the saucer or its equivalent. The reverse curve 21 of clip 18 serves as an additional support for the tray and saucer, thus stabilizing the tray. The clip is provided with a hinge part 22 which is held in the member 23 to snap up or down. Stop shoulders 24 hold the clip in open position. It will be observed that this type of spring clip offers a wide base of support and that the hinged feature permits the clip to be turned down for close nested packing for either shipping or storing.

While I have described the above specific form of tray used in combination with a cup and saucer as illustrative of an embodiment of my invention, I do not thereby desire to be unduly limited as various modifications falling wholly within the spirit and scope of my invention will no doubt present themselves to those versed in the art.

What I claim therefore as new and useful of my own invention and desire to secure by Letters Patent is:

1. A guest tray for adjustably attaching to a saucer or like dish, comprising a body portion having a recess for receiving a cup and clamping members on said body portion arranged in spaced relation and extending towards said recess from diametrically opposite sides to admit receiving saucers of different diameter.

2. A guest tray for adjustably attaching to a saucer or like dish, comprising a tray body portion, a cup holding contour in the edge thereof and clip members on said tray body, said clip members extending from the outer edge of the tray body towards the cup body contour, whereby the tray body is securely held on the saucer rim at various positions.

3. An attachable tray comprising a body part having a cup holding contour and means extending from opposing sides of the body part along a line corresponding to the diameter of a saucer when the tray is applied for use to hold the saucer and tray in fixed relation.

4. A tray for attaching to a dish comprising a body part having a cup holding contour and means extending from opposing sides of the body part along a line corresponding to the diameter of a dish when the tray is applied for use, said means comprising spring clips having a widened base and extending from opposite sides towards the center of the dish.

In testimony whereof I have hereunto set my hand on this 22nd day of December, A. D. 1924.

HENRY WELLEN.